US012724265B2

(12) United States Patent
Yamada

(10) Patent No.: US 12,724,265 B2
(45) Date of Patent: Sep. 1, 2026

(54) VEHICLE DISPLAY DEVICE

(71) Applicant: YAZAKI CORPORATION, Tokyo (JP)

(72) Inventor: Yoshihisa Yamada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 182 days.

(21) Appl. No.: 18/919,324

(22) Filed: Oct. 17, 2024

(65) Prior Publication Data

US 2025/0035927 A1 Jan. 30, 2025

Related U.S. Application Data

(63) Continuation of application No. PCT/JP2023/032272, filed on Sep. 4, 2023.

(30) Foreign Application Priority Data

Sep. 29, 2022 (JP) ................................ 2022-155910

(51) Int. Cl.
*G02B 27/01* (2006.01)

(52) U.S. Cl.
CPC ..... *G02B 27/0149* (2013.01); *G02B 27/0101* (2013.01); *G02B 2027/0154* (2013.01)

(58) Field of Classification Search
CPC ......... B60K 35/00; B60K 35/23; B60R 11/02; G02B 2027/0154; G02B 2027/0159;
(Continued)

(56) References Cited

U.S. PATENT DOCUMENTS 9,690,098 B1 * 6/2017 Kuo .................. G02B 27/0149
2016/0209663 A1 * 7/2016 Hirokawa .......... G02B 27/0101
(Continued)

FOREIGN PATENT DOCUMENTS

JP 2018-505435 A 2/2018
JP 2020-154004 A 9/2020
JP 2021-187429 A 12/2021

OTHER PUBLICATIONS

International Search Report for PCT/JP2023/032272 dated Nov. 21, 2023.

*Primary Examiner* — Nan-Ying Yang
(74) *Attorney, Agent, or Firm* — KENEALY VAIDYA LLP

(57) ABSTRACT

A vehicle display device includes a display device unit and a combiner unit. The display device unit includes an image display device, an accommodation unit that accommodates a lower display region, a reflection member that is rotatable, a motor that turns the reflection member, and a control unit. The combiner unit includes a hood portion and a combiner that is disposed closer to an eye point than the upper display region. The reflection member reflects display light in the lower display region toward the combiner, and a rotation direction of the reflection member is a direction in which a projection position of the display light is changed in a vehicle vertical direction. The control unit sets a display position of an image in the image vertical direction in the lower display region so that the motor can turn the reflection member to a rotation position corresponding to the eye point.

6 Claims, 13 Drawing Sheets

(58) Field of Classification Search
CPC ............ G02B 2027/0181; G02B 27/01; G02B 27/0101; G02B 27/0149
See application file for complete search history.

(56) References Cited

U.S. PATENT DOCUMENTS

| | | | | |
|---|---|---|---|---|
| 2017/0336642 | A1* | 11/2017 | Mermillod ................ | G06T 3/20 |
| 2017/0351134 | A1* | 12/2017 | Shimatani ............ | G02B 5/3083 |
| 2021/0370775 | A1 | 12/2021 | Yamada | |

* cited by examiner 100
110
120
1
U1
U2
U3
60
61
62
6
4
8
AR1
7
7a
5
5a
5b
10
30
30u
30d
70
3
9
EP
GV
Z1
Z2
Z
X
X1
X2

GV
Z1
Z
Z2
EP
110
120
1
U1
U3
U2
60
61
62
6
4
8
AR1
Lt
X1
X
X2
7
7a
5
5a
10
30u
30
30d
5b
70
3
9
100
Vi

ER
EPu
EPd
Z
Z1
Z2
X
X1
X2
1
U1
U2
U3
110
120
100
60
61
62
6
4
8
AR1
Lt
7
7a
5
5a
5b
10
30
30u
30d
70
9
3
Vi 100
110
1
U2
U3
U1
EPu
EP
ER
EPd
10
5
7
5b
7a
70
5a
60
120
Vi
30u
61
30
62
Z1
Lt
3
6
30d
4
Z
9
8
AR1
Z2
X1
X
X2

ER
EPu
EPd
Z1
Z
Z2
110
120
1
U1
U3
U2
60
61
62
6
4
8
AR1
Lt
X
X1
X2
7
7a
5
5a
10
30u
30
30d
5b
70
3
9
100
Vi

VEHICLE DISPLAY DEVICE

CROSS-REFERENCE TO RELATED APPLICATION(S)

This application is a continuation application of International Application No. PCT/JP2023/032272 filed on Sep. 4, 2023 which claims the benefit of priority from Japanese Patent Application No. 2022-155910 filed on Sep. 29, 2022 and designating the U.S., the entire contents of which are incorporated herein by reference.

BACKGROUND OF THE INVENTION

1. Field of the Invention

The present invention relates to a vehicle display device.

2. Description of the Related Art

In the related art, there is a display device. Japanese Patent Application Laid-open No. 2020-154004 discloses a display device including a mirror that reflects light from an image display unit, and a half mirror that is interposed between the image display unit and the mirror and transmits the light from the image display unit while reflecting the light reflected by the mirror toward a viewer side.

The vehicle display device is required to be designed according to the requirements on the vehicle side. However, when the entire device is designed from scratch for each vehicle type, many man-hours are required for the design. When some units can be made common to a plurality of vehicle types, design man-hours can be reduced.

SUMMARY OF THE INVENTION

An object of the present invention is to provide a vehicle display device capable of sharing some units.

Solution to Problem

In order to achieve the above mentioned object, a vehicle display device according to one aspect of the present invention includes a display device unit including an image display device; a combiner unit assembled to the display device unit, wherein the display device unit includes the image display device including an upper display region and a lower display region for displaying an image, the upper display region being disposed to face an eye point of a vehicle, an accommodation unit that accommodates the lower display region and is open upward, a reflection member that is accommodated in the accommodation unit and is rotatable within a predetermined range, a motor that turns the reflection member, and a control unit that controls the image display device and the motor, wherein the combiner unit includes a hood portion covering the upper display region from a front of the vehicle, and a combiner disposed closer to the eye point than the upper display region, wherein the combiner has a display height, wherein the display height is the height of the combiner in a vehicle vertical direction, or the height of the combiner in an image vertical direction when viewed from the eye point, wherein the display device unit is configured to be able to combined with any of the plurality of combiner units having different display heights, wherein the reflection member is disposed closer to the eye point than the lower display region and the combiner, and reflects display light of the lower display region toward the combiner, wherein a rotation direction of the reflection member is a direction in which a projection position of the display light is changed in the vehicle vertical direction, and wherein the control unit is configured to set a display position of an image in the lower display region in the image vertical direction according to the display height of the combiner assembled to the display device unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited by the embodiment. In addition, constituent elements in the following embodiments include those that can be easily assumed by those skilled in the art or those that are substantially the same.

Embodiments

Figure 1:
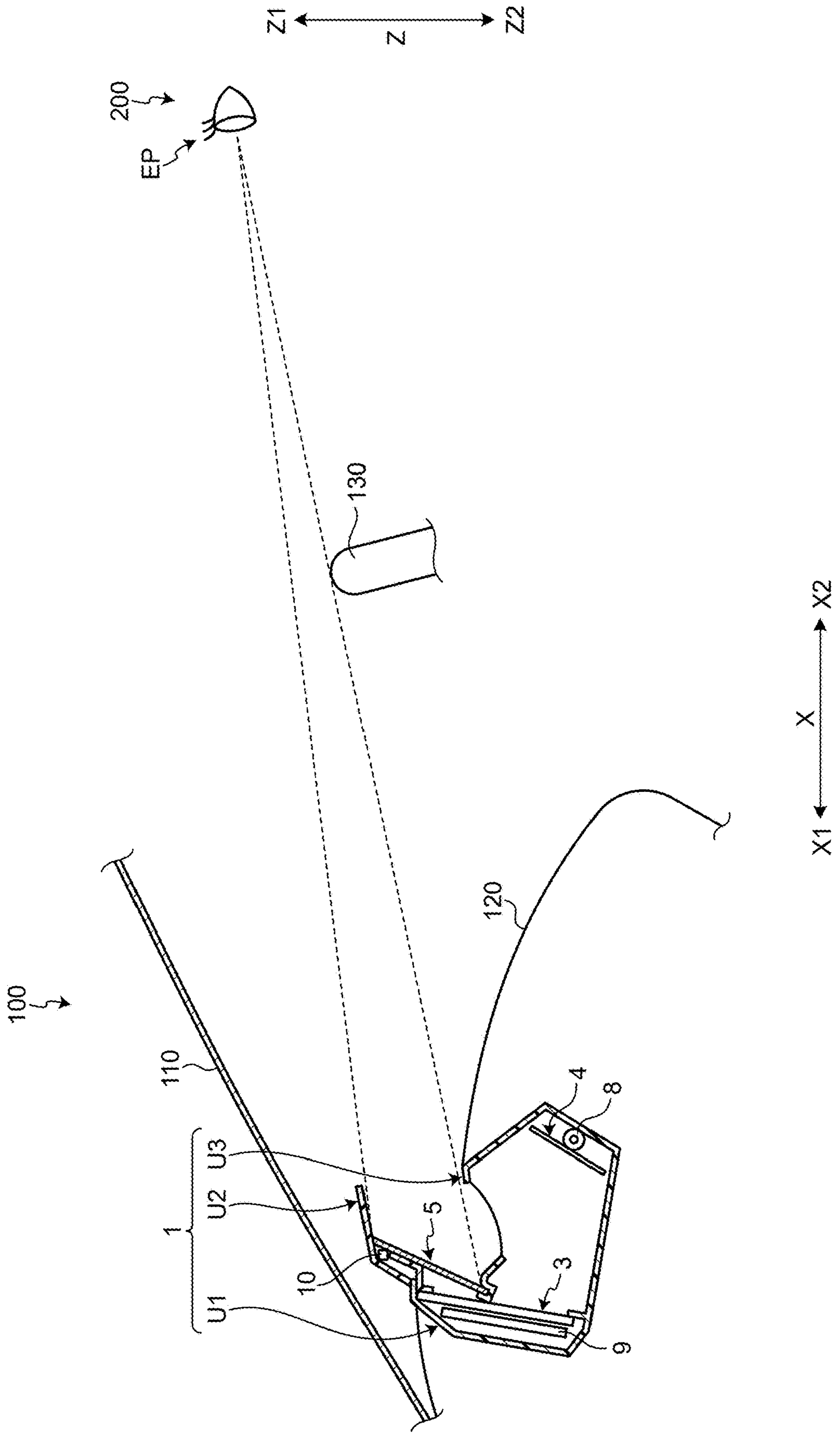
FIG. 1 is a view illustrating a vehicle display device according to an embodiment.
Figure 4:
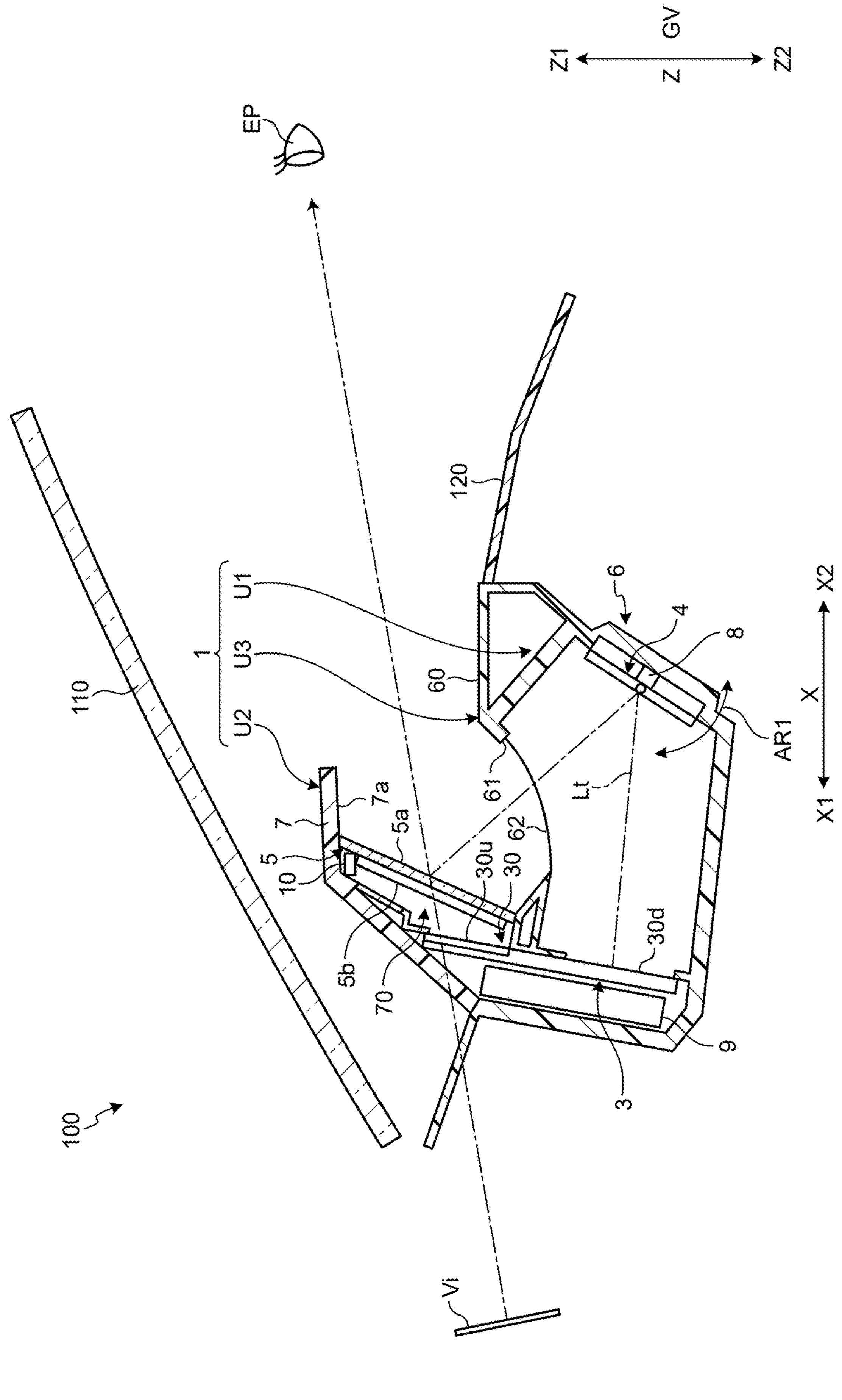
FIG. 4 is a cross-sectional view of the vehicle display device according to the embodiment.
Figure 5:
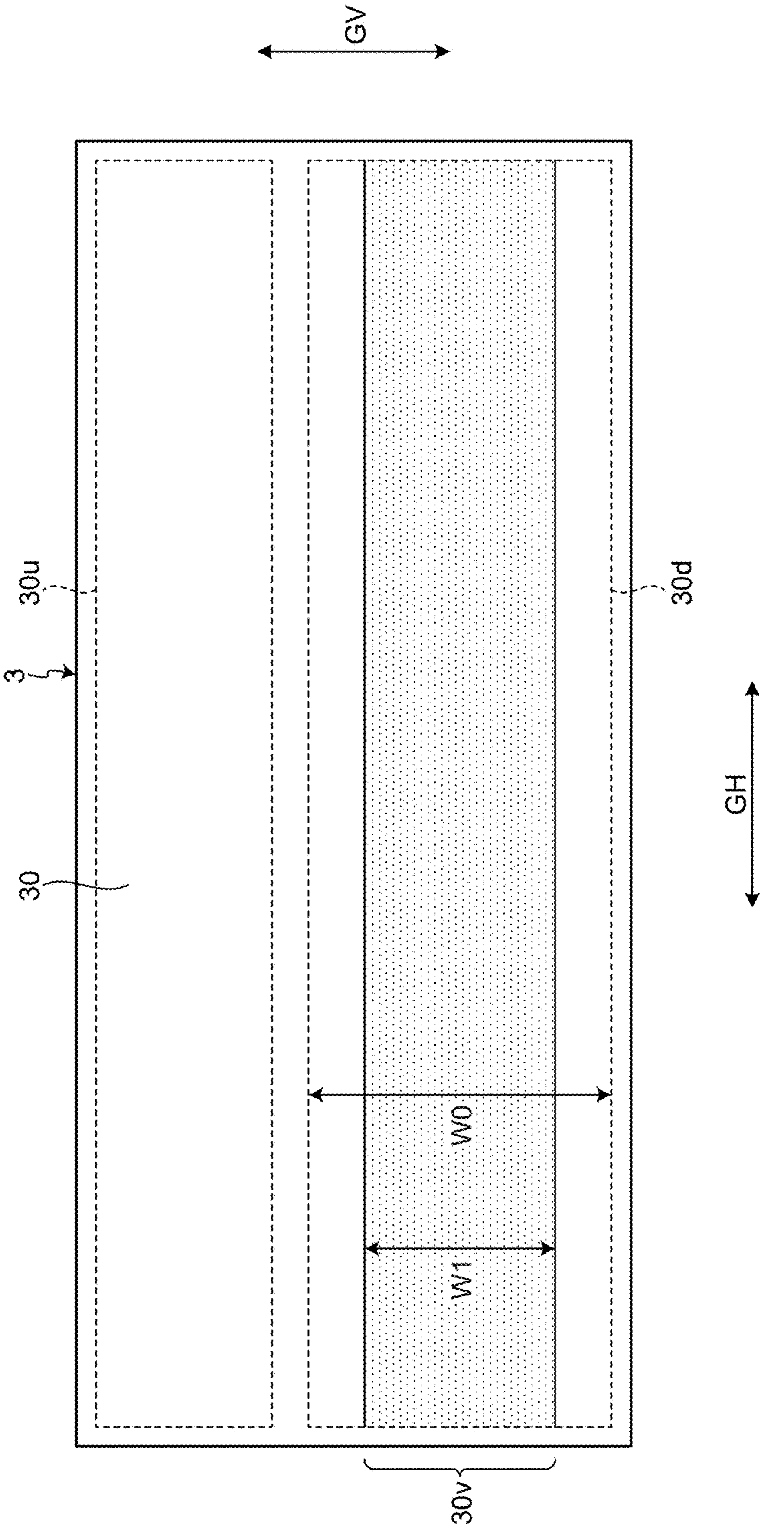
FIG. 5 is a plan view of the image display device according to the embodiment.
Figure 6:
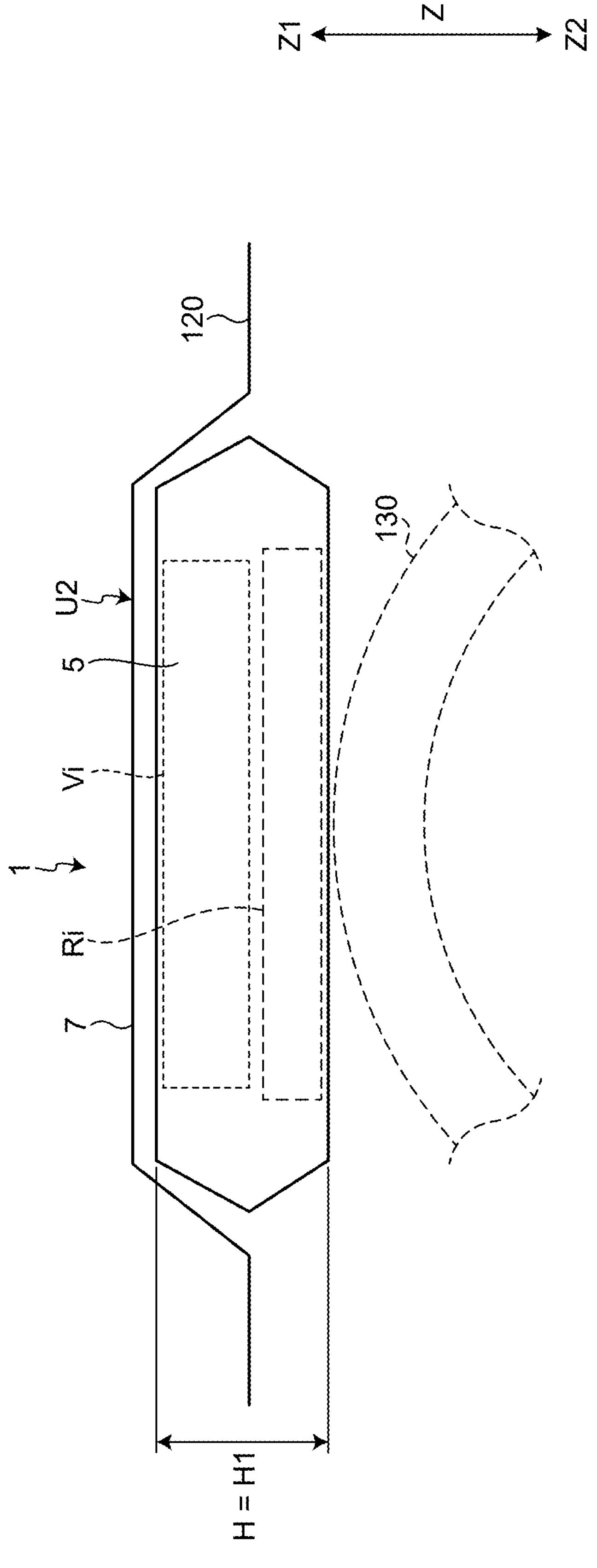
FIG. 6 is a diagram illustrating an example of the combiner unit.
Figure 7:
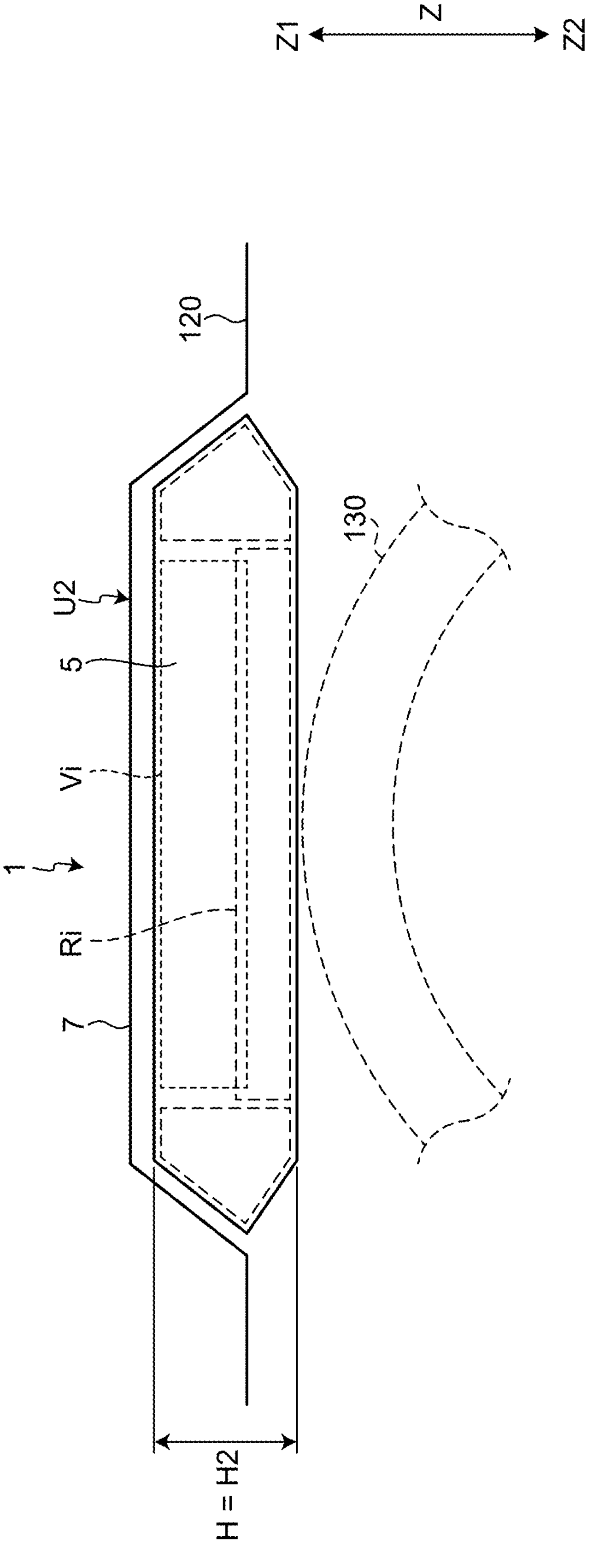
FIG. 7 is a diagram illustrating an example of the combiner unit.
Figure 8:
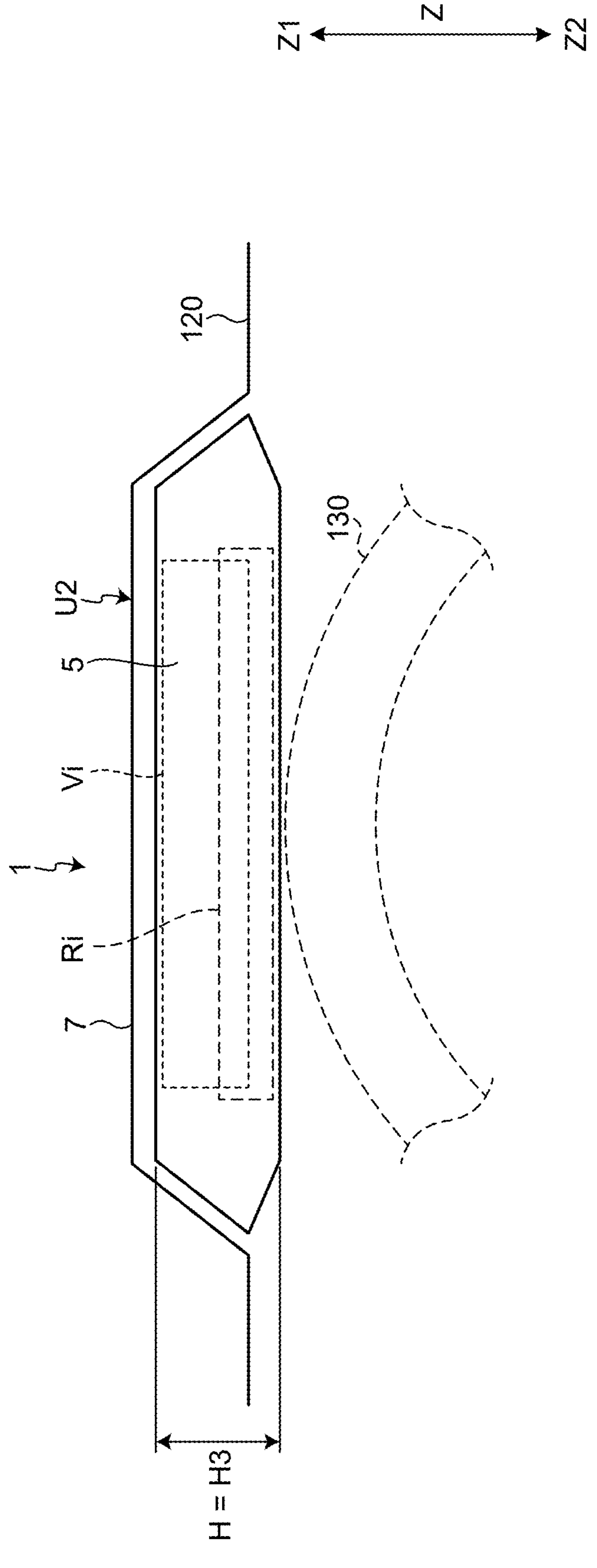
FIG. 8 is a diagram illustrating an example of the combiner unit.
Figure 9:
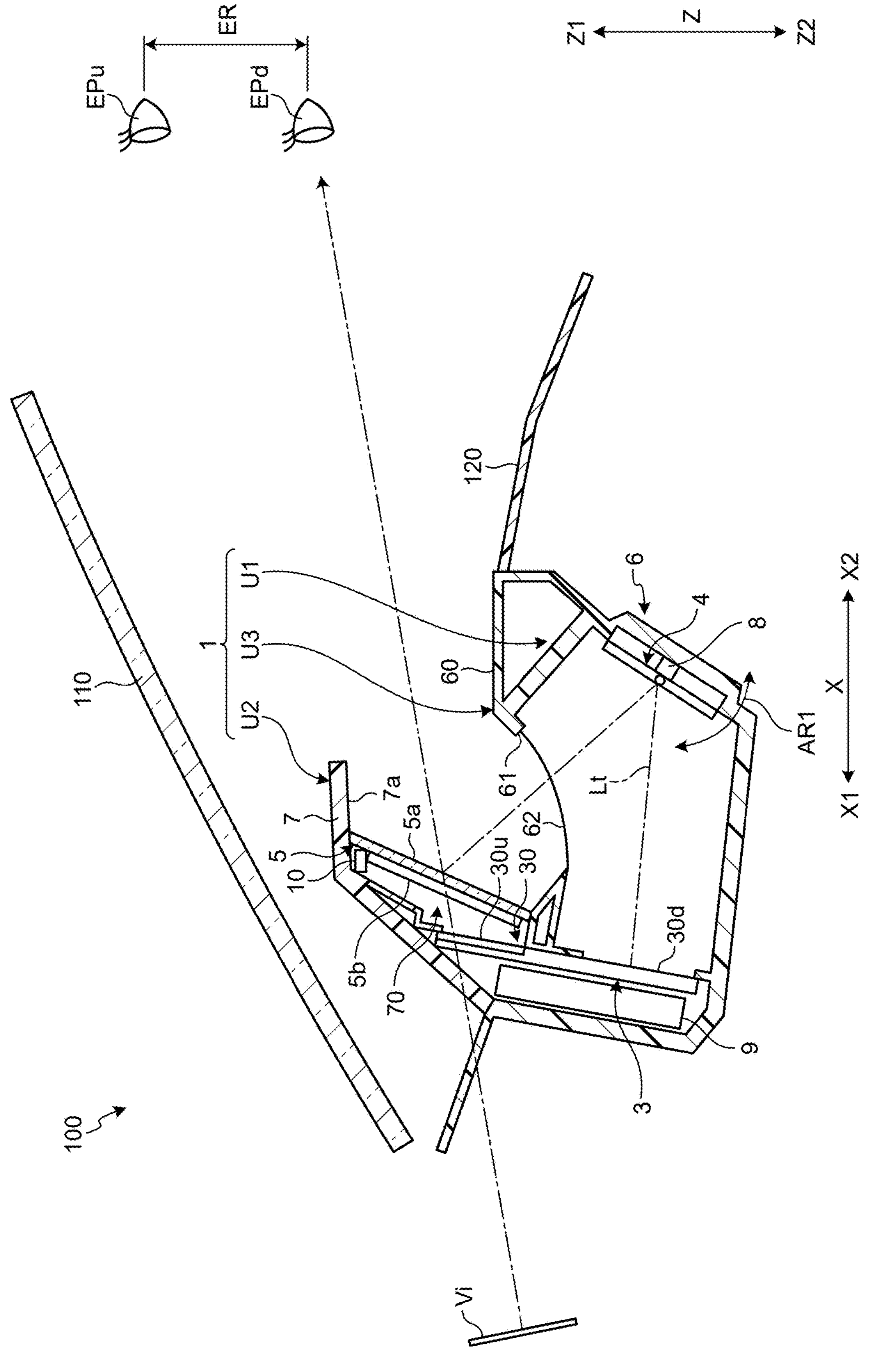
FIG. 9 is a view illustrating an optical path in a standard state.
Figure 10:
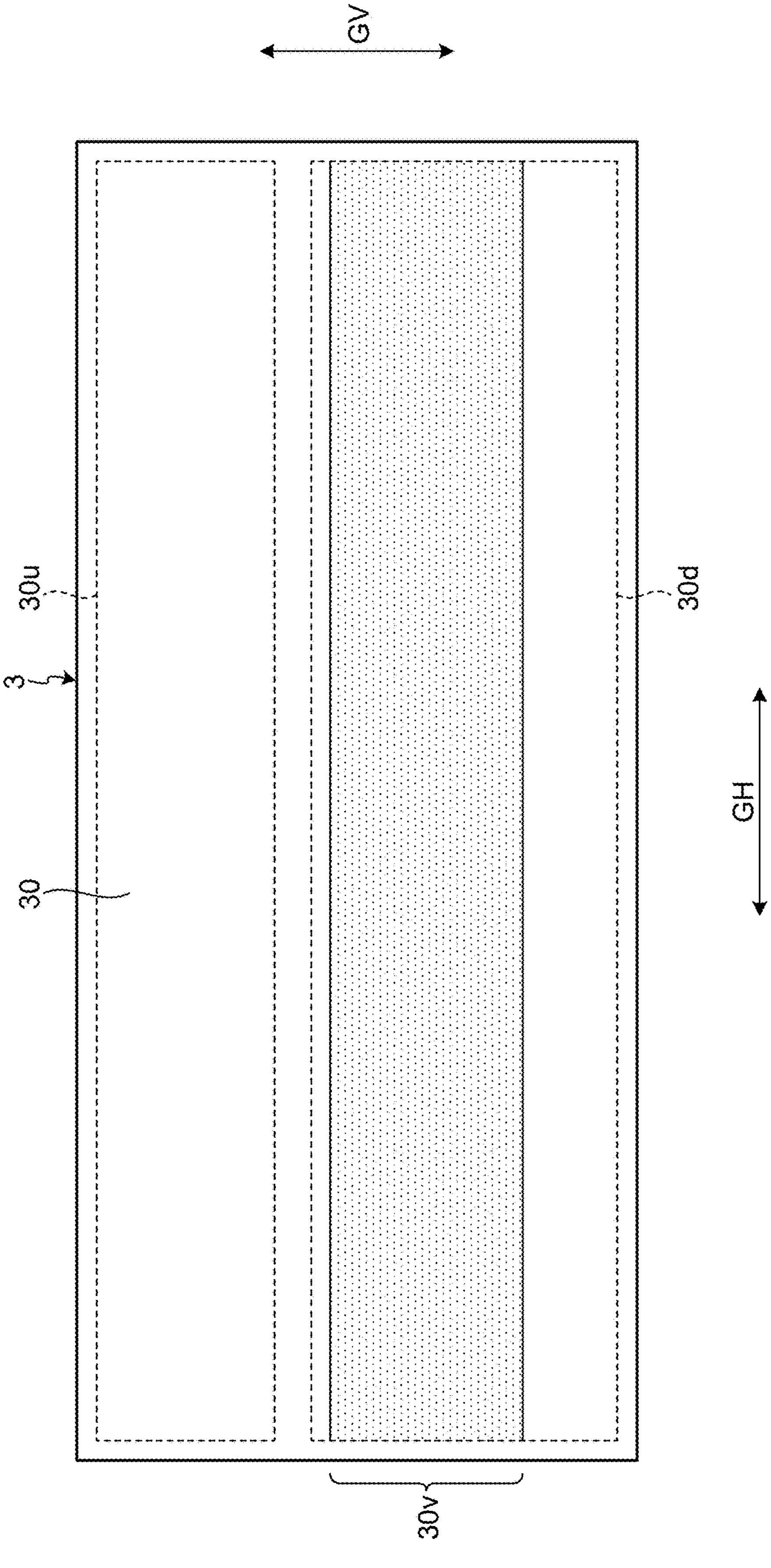
FIG. 10 is a view illustrating a display range after adjustment according to the embodiment.

An embodiment will be described with reference to FIGS. 1 to 13. The present embodiment relates to a vehicle display device. FIG. 1 is a diagram illustrating a vehicle display device according to the embodiment, FIG. 2 is a front view of a combiner unit according to the embodiment, FIGS. 3 and 4 are cross-sectional views of the vehicle display device according to the embodiment, FIG. 5 is a plan view of an image display device according to the embodiment, FIGS. 6 to 8 are diagrams illustrating an example of the combiner unit, FIG. 9 is a diagram illustrating an optical path in a standard state, and FIG. 10 is a diagram illustrating a display range after adjustment of the embodiment.

Figure 11:
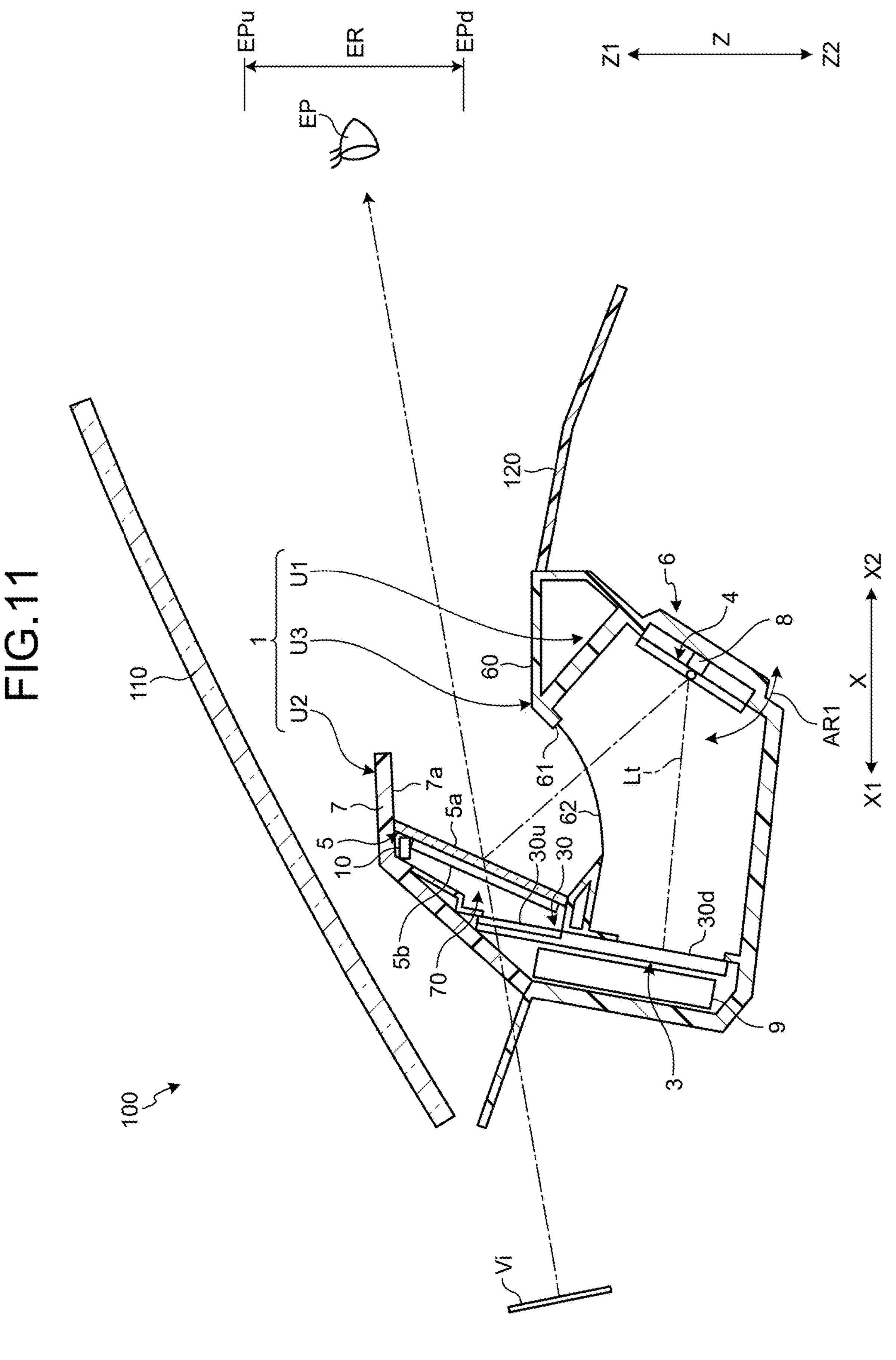
FIG. 11 is a view illustrating an optical path after adjustment according to the embodiment.
Figure 12:
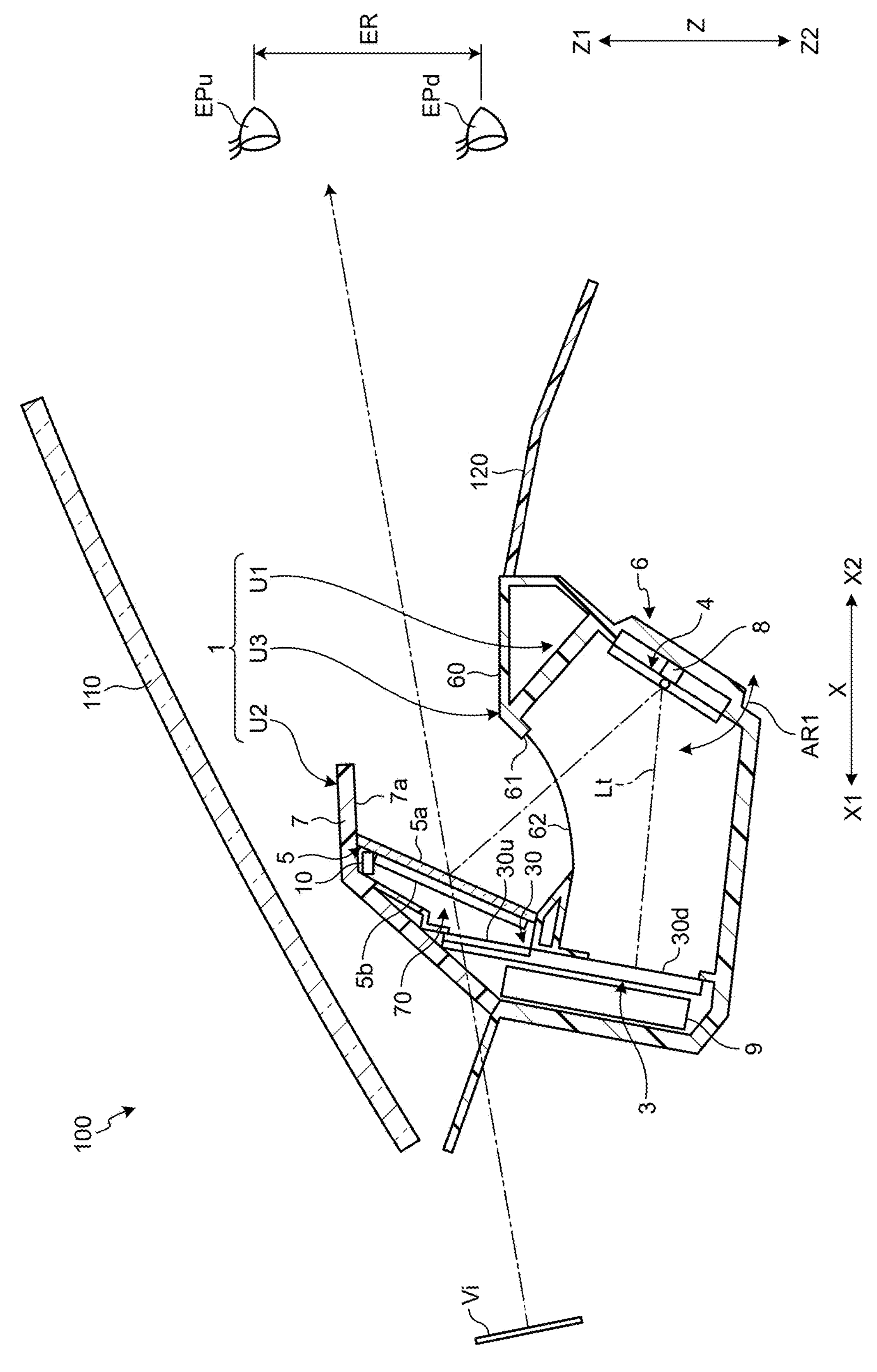
FIG. 12 is a view illustrating an optical path in a standard state.
Figure 13:
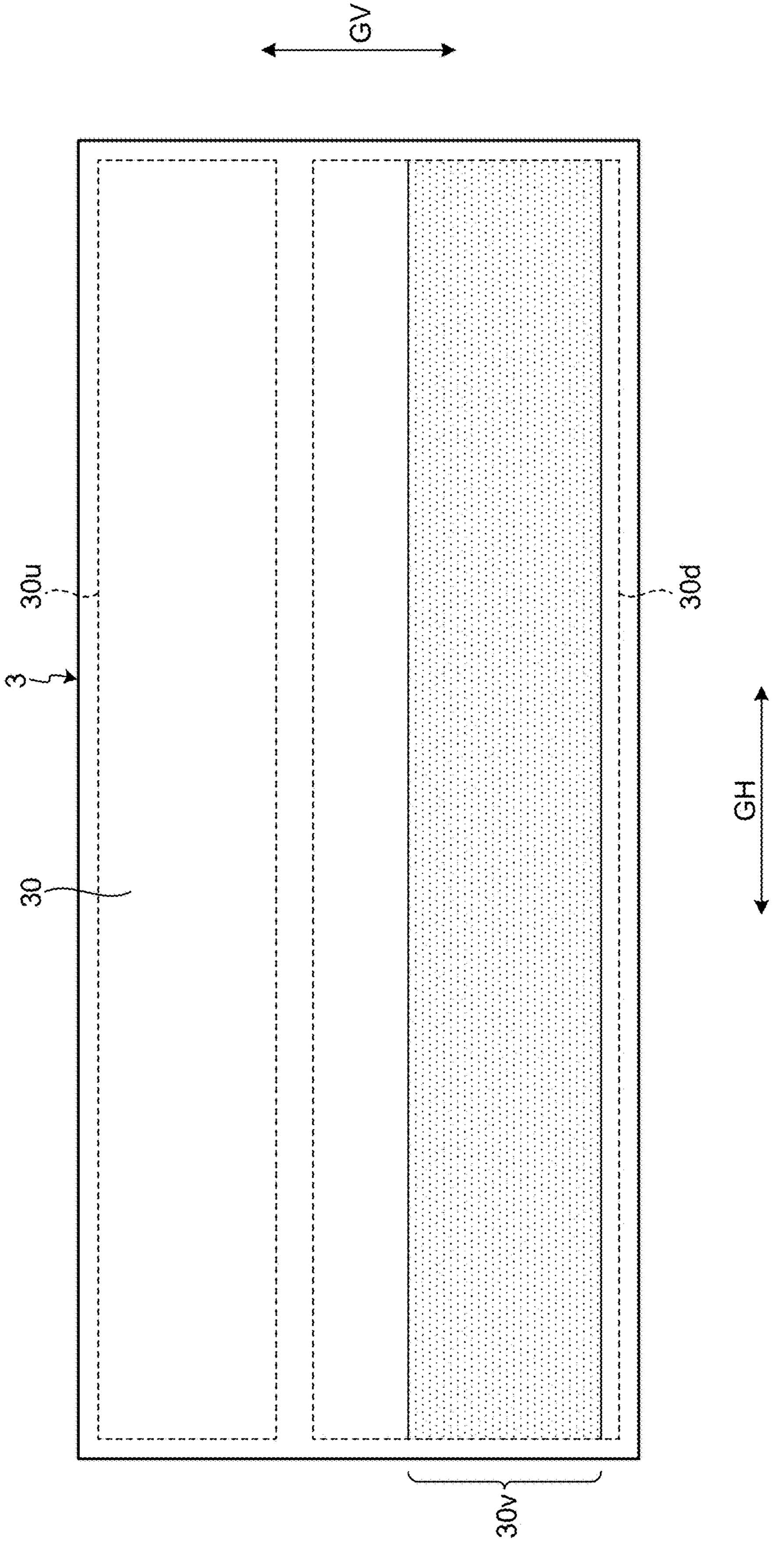
FIG. 13 is a view illustrating a display range after adjustment according to the embodiment.

FIG. 11 is a diagram illustrating an optical path after adjustment according to the embodiment, FIG. 12 is a diagram illustrating an optical path in a standard state, and FIG. 13 is a diagram illustrating a display range after adjustment according to the embodiment.

A vehicle display device 1 of the present embodiment is mounted on a vehicle 100 such as an automobile. The vehicle display device 1 according to the present embodiment is a meter device capable of composite display using the real image Ri and the virtual image Vi. The illustrated vehicle display device 1 is disposed in an instrument panel 120. For example, the vehicle display device 1 is disposed so that the display image is located above a steering wheel 130 when viewed from the driver.

Figure 2:
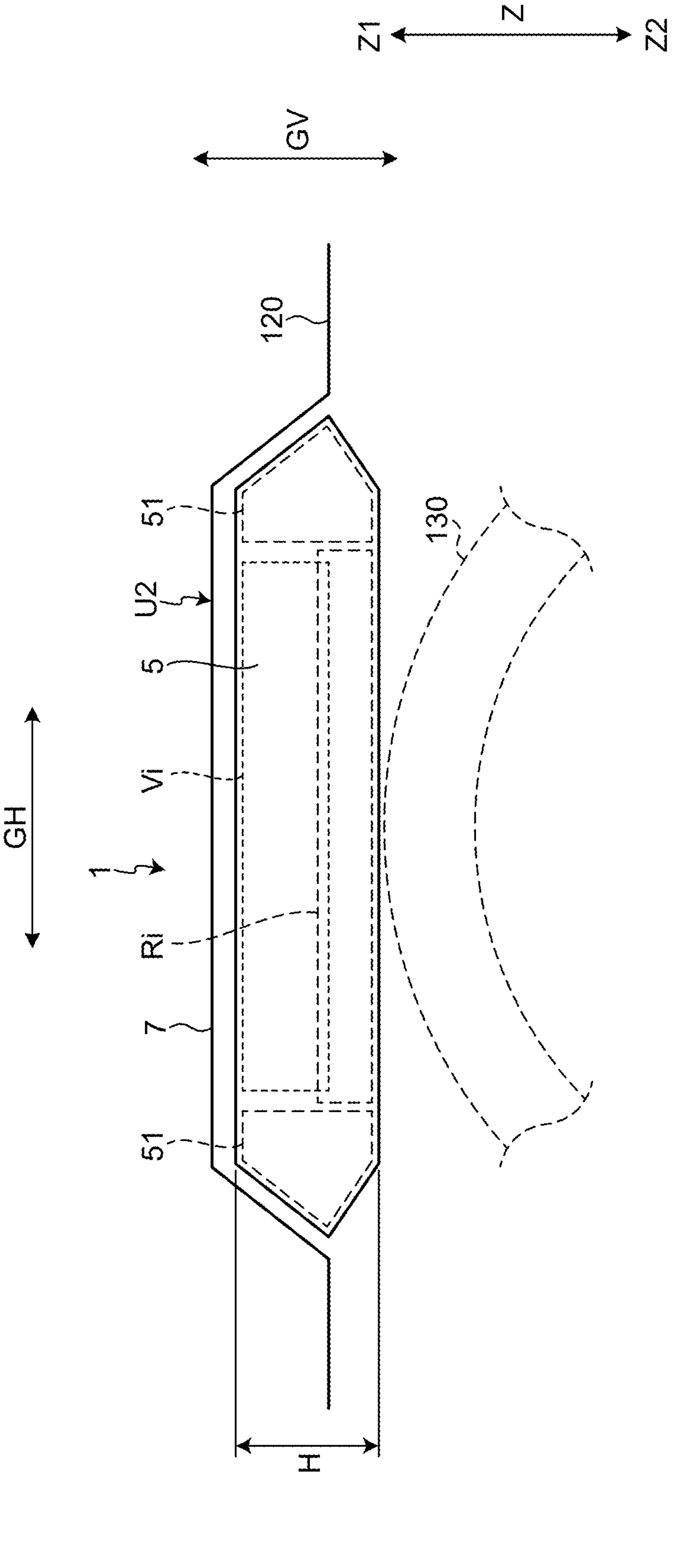
FIG. 2 is a front view of a combiner unit according to the embodiment.
Figure 3:
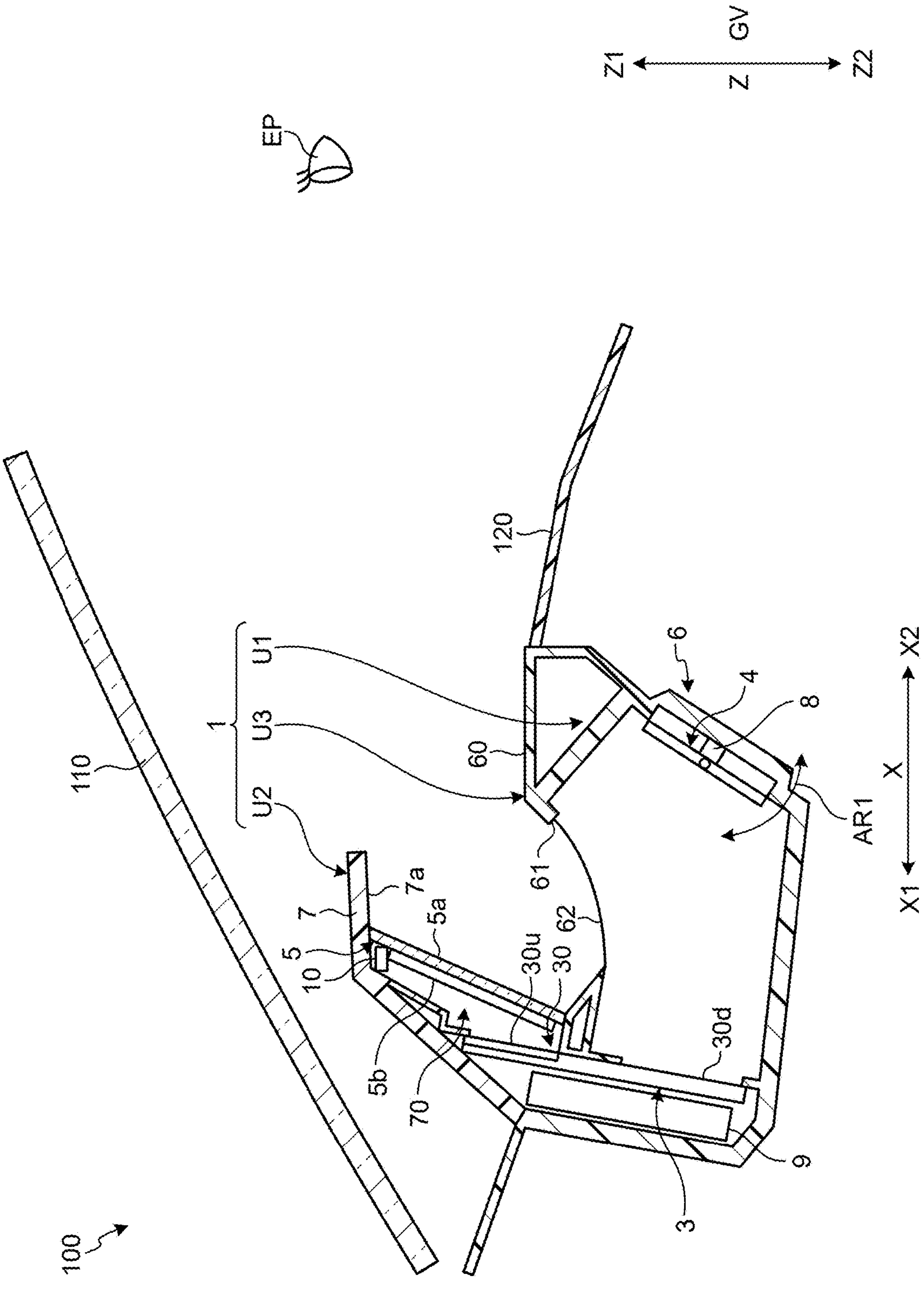
FIG. 3 is a cross-sectional view of the vehicle display device according to the embodiment.

As illustrated in FIGS. 1 to 3, the vehicle display device 1 according to the present embodiment includes a display device unit U1, a combiner unit U2, a cover unit U3, and a camera 10. The combiner unit U2 and the cover unit U3 are designed according to vehicle requirements. For example, the display height H and the inclination angle of a combiner 5 illustrated in FIG. 2 are determined according to the shape of the instrument panel 120, the position of the steering wheel 130, and the like. For example, the position and shape of a cover 62 of the cover unit U3 are determined according to the display height H and the inclination angle of the combiner 5. The display height H may be the height of the combiner 5 in the vehicle vertical direction Z, or may be the height of the combiner 5 in the image vertical direction GV when viewed from the eye point EP.

As described below, in the vehicle display device 1 of the present embodiment, the display device unit U1 can be made common to the combiner unit U2 and the cover unit U3 having different specifications. Therefore, it is possible to reduce the number of design steps in the vehicle display device 1.

As illustrated in FIG. 3, the display device unit U1 includes an accommodation unit 6, an image display device 3, a reflection member 4, a motor 8, and a control unit 9. The accommodation unit 6 is accommodated in the instrument panel 120. The shape of the accommodation unit 6 is a bottomed cylindrical shape and is open upward. The accommodation unit 6 is formed of a material having a light shielding property. The opening of the accommodation unit 6 is closed by the cover unit U3.

The cover unit U3 includes a lid portion 60 and the cover 62. The lid portion 60 is assembled to the accommodation unit 6 to form an accommodation space. The lid portion 60 has a through hole 61. The cover 62 is disposed in the through hole 61 and closes the through hole 61. The through hole 61 is located closer to the rear side X2 than the image display device 3, that is, closer to the eye point EP. The cover 62 is a transparent member, and is formed of resin, for example. The shape of the cover 62 is a curved shape curved toward the inside of the accommodation unit 6. The cover 62 is formed to reflect external light toward the light shielding wall. For example, the cover 62 reflects the external light transmitted through a windshield 110 toward the wall face of a hood portion 7 or a direction other than that of the eye point.

In the following description, a front side in the vehicle longitudinal direction X is referred to as the "front side X1", and a rear side in the vehicle longitudinal direction X is referred to as the "rear side X2". An upper side in the vehicle vertical direction Z is referred to as the "upper side Z1", and a lower side in the vehicle vertical direction Z is referred to as the "lower side Z2". The image vertical direction of the image displayed by the vehicle display device 1 corresponds to the vehicle vertical direction Z.

The image display device 3 is a device that displays an image, and is, for example, a liquid crystal display device such as a thin film transistor-liquid crystal display (TFT-LCD). The image display device 3 includes a backlight unit, and outputs display light by light of the backlight unit. As illustrated in FIG. 3, the image display device 3 includes an upper display region 30*u* and a lower display region 30*d*. The upper display region 30*u* and the lower display region 30*d* are light emitting regions for outputting display light. The upper display region 30*u* is located on the upper side Z1 of a display face 30 of the image display device 3. The lower display region 30*d* is located on the lower side Z2 of the display face 30.

The image display device 3 is disposed so that the upper display region 30*u* faces the eye point EP. For example, the image display device 3 is fixed to the accommodation unit 6 and held by the accommodation unit 6. As illustrated in FIG. 3, the accommodation unit 6 stores the lower display region 30*d* and holds the image display device 3. The image display device 3 is disposed at the end portion of the accommodation unit 6 in the front side X1 direction, and the display face 30 is directed in the rear side X2 direction. The upper display region 30*u* protrudes upward from the accommodation unit 6.

The reflection member 4 is disposed inside the accommodation unit 6. The reflection member 4 is disposed at the end portion of the accommodation unit 6 in the rear side X2 direction and faces the lower display region 30*d*. The reflection member 4 is, for example, a flat mirror.

The reflection member 4 of the present embodiment is rotatably supported. The rotation direction of the reflection member 4 is a direction in which the inclination angle of the reflection member 4 with respect to the vehicle vertical direction Z is changed as indicated by an arrow AR1 in FIG. 3. The reflection member 4 is rotatable within a predetermined range. The predetermined range may be, for example, an angular range of 10 [°]. The motor 8 turns the reflection member 4 to adjust the inclination angle of the reflection member 4 to a desired angle. The motor 8 is, for example, a stepping motor.

The control unit 9 controls the image display device 3 and the motor 8. The control unit 9 is, for example, a computer including an arithmetic unit, a memory, a communication interface, and the like. The control unit 9 controls the motor 8 and the image display device 3 according to a program stored in advance, for example. The vehicle display device 1 preferably includes a nonvolatile memory that stores various pieces of data and programs.

The camera 10 images a driver 200 and detects the position of the eye point EP. The illustrated camera 10 is disposed at an upper center (or left and right, etc.) in the meter display unit and is installed so as to be able to image the driver 200. The position of the eye point EP in the vehicle vertical direction Z is detected by image recognition on the image generated by the camera 10. The camera 10 may calculate the position of the eye point EP in the vehicle width direction. The camera 10 can output a coordinate value of the detected eye point EP.

The combiner unit U2 is assembled to the display device unit U1. Combiner unit U2 includes the combiner 5 and a hood portion 7. The hood portion 7 has a light shielding property and covers the upper display region 30*u* from the front and the upper side of the vehicle. The hood portion 7 may be fixed to the accommodation unit 6. The upper display region 30*u* of the image display device 3 is accommodated in an internal space 70 of the hood portion 7. The hood portion 7 is formed so as to be able to shield the upper display region 30*u* from external light.

The combiner 5 is disposed so as to cover internal space 70 of the hood portion 7. That is, the combiner 5 is disposed so as to shield the internal space 70 when viewed from the eye point EP. The combiner 5 may be fixed to the accommodation unit 6 or may be fixed to the hood portion 7. The upper display region 30*u* of image display device 3 is located behind the combiner 5 when viewed from the eye point EP. In other words, the combiner 5 is disposed closer to the eye point EP than the upper display region 30*u*.

The combiner 5 includes, for example, a half mirror. The combiner 5 is a reflection member capable of transmitting light incident on the back face and reflecting light incident on the front face. The combiner 5 has a reflection face 5*a* facing the eye point EP. The reflection face 5*a* is disposed on a front face of the combiner 5, the front face facing the eye point EP, or a back face facing opposite to the eye point EP. The reflection face 5*a* may be subjected to coating processing or the like for reflecting light toward the eye point EP. A reflection suppressing portion 5*b* is provided on the back face of the combiner 5. The reflection suppressing portion 5*b* suppresses reflection of the display light of the upper display region 30*u* toward the front side X1. The reflection suppressing portion 5*b* may be a surface treatment for suppressing reflection on the combiner 5, or may be a sheet attached to the combiner 5.

As illustrated in FIG. 3, the reflection member 4 faces the reflection face 5*a* of the combiner 5 via the through hole 61 of the cover unit U3 disposed therebetween. As illustrated in FIG. 4, the reflection member 4 reflects display light Lt output from the lower display region 30*d* toward the combiner 5. The reflection face 5*a* of the combiner 5 reflects the display light Lt in the lower display region 30*d* toward the eye point EP. The virtual image Vi visually recognized at the eye point EP is formed at a position on the front side X1 relative to the reflection face 5*a*. The virtual image Vi is a virtual image of the lower display region 30*d*, and includes an image displayed in the lower display region 30*d*.

The projection position of the display light Lt on the combiner 5 changes according to the inclination angle of the reflection member 4. When the inclination angle of reflection member 4 increases, the projection position of display light Lt on the combiner 5 moves upward. On the other hand, when the inclination angle of reflection member 4 decreases, the projection position of display light Lt on the combiner 5 moves downward.

As illustrated in FIG. 2, the vehicle display device 1 according to the present embodiment performs composite display using a real image Ri and a virtual image Vi. The real image Ri is an image displayed in the upper display region 30*u* of the image display device 3. The display light of the upper display region 30*u* is transmitted through the combiner 5 toward the eye point EP. The virtual image Vi is a virtual image generated by the display light Lt in the lower display region 30*d*. That is, the virtual image Vi is an image visually recognized by the display light Lt reflected toward the eye point EP by the reflection member 4 and the combiner 5. The virtual image Vi is displayed above the real image Ri in the image vertical direction GV.

A display region 51 of a telltale is provided at an end of the combiner 5 in the image lateral direction GH. The display of the telltale is executed by, for example, a display device disposed behind the display region 51.

In the vehicle display device 1 of the present embodiment, different combiner units U2 can be assembled to the common display device unit U1. In order to cope with the combiner units U2 having different specifications, the control unit 9 of the present embodiment is configured to adjust a display position of an image in the lower display region 30*d*. As illustrated in FIG. 5, the upper display region 30*u* and the lower display region 30*d* are different regions on the display face 30. A region between the upper display region 30*u* and the lower display region 30*d* is covered with, for example, a mask member or mask printing.

In the lower display region 30*d*, a display range 30*v* in the image vertical direction GV is set. The display range 30*v* is a range used for image display for the virtual image Vi in the lower display region 30*d*. The display light Lt in the lower display region 30*d* is output from the display range 30*v*. The height W1 of the display range 30*v* is smaller than the height W0 of the lower display region 30*d*. That is, the control unit 9 displays an image in the display range 30*v* that is part of the lower display region 30*d*. The display range 30*v* illustrated in FIG. 5 is located at the center of the lower display region 30*d* in the image vertical direction GV. As described below, the display device unit U1 of the present embodiment can be combined with any of the plurality of combiner units U2 having different display heights H.

FIGS. 6 to 8 illustrate three combiner units U2 having different display heights H. The display height H of the combiner unit U2 in FIG. 6 has a value of H1. The display height H of the combiner unit U2 in FIG. 7 has a value of H2, and the value H2 is smaller than the value H1. The display height H of the combiner unit U2 in FIG. 8 has a value of H3, and the value H3 is smaller than the value H2. That is, the display height H of the combiner unit U2 in FIG. 6 is relatively the largest, and the display height H of the combiner unit U2 in FIG. 8 is relatively the smallest.

For example, the control unit 9 sets the display range 30*v* in the lower display region 30*d* according to the display height of the combiner 5. The display range 30*v* is set based on, for example, a setting value stored in the nonvolatile memory. As described below, the setting value is determined so that a range in which the optical path of the display light Lt can be adjusted up and down by the rotation of the reflection member 4 can be appropriately associated with a necessary optical path range determined from the eye range ER of the vehicle 100.

FIG. 9 illustrates an optical path of the display light Lt in a standard state in which the display range 30*v* is not optimized for the combiner unit U2. The display range 30*v* in the standard state is, for example, a center position in the lower display region 30*d*. The rotation position of the reflection member 4 in FIG. 9 is a neutral position in a rotatable predetermined range. The neutral position is a position where rotation of the same angle is allowed in both the clockwise direction and the counterclockwise direction.

FIG. 9 illustrates the eye range ER, the upper end position EPu, and the lower end position EPd of the vehicle 100. The eye range ER is a statistical representation of the distribution of the positions of the driver's eyes, and is a region along the vehicle width direction and the vehicle vertical direction Z. The relative position of the eye range ER with respect to the vehicle display device 1 may differ depending on the vehicle type or the like. The upper end position EPu is the position of the eye point EP at the upper end in the eye range ER. The lower end position EPd is the position of the eye point EP at the lower end of the eye range ER.

The optical path of the display light Lt illustrated in FIG. 9 corresponds to the eye point EP closer to the lower end position EPd than the center of the eye range ER. Such a state occurs, for example, in the combiner unit U2 illustrated in FIG. 6. The combiner unit U2 in FIG. 6 has large display height H. In this case, in the standard state, the projection position of the display light Lt on the combiner 5 is slightly lower than the optimum position.

FIG. 10 illustrates the display range 30*v* optimized for the combiner unit U2 of FIG. 6. The control unit 9 sets the display range 30*v* based on the setting value read from the nonvolatile memory. The display range 30*v* in FIG. 10 is set above the center of the lower display region 30*d* in the image vertical direction GV. FIG. 11 illustrates an optical path of the display light Lt corresponding to the display range 30*v* of FIG. 10. In FIG. 11, the rotation position of the reflection member 4 is a neutral position. The optical path of FIG. 11 corresponds to the eye point EP at the center of the eye range ER. In other words, when viewed from the eye point EP at the center of the eye range ER, the virtual image Vi is displayed at an appropriate position with respect to the real image Ri as illustrated in FIG. 6. In the present specification, such a projection position of the display light Lt is referred to as a "reference position".

The reference position is a projection position of the display light Lt on the combiner 5, and is such a position that the position of the virtual image Vi is optimized when viewed from the eye point EP at the center of the eye range ER. When the projection position is the reference position, it is possible to optimize the projection position with respect to each eye point EP by rotating the reflection member 4 by the motor 8. That is, the motor 8 can turn the reflection member 4 to a position corresponding to the eye point EP for all the eye points EP from the upper end position EPu to the lower end position EPd. In other words, the position of the virtual image Vi can be optimized by the motor 8 for all the eye points EP of the eye range ER.

FIG. 12 illustrates an optical path of the display light Lt in a standard state with respect to the combiner unit U2 of FIG. 8. The combiner unit U2 in FIG. 8 has small display height H. In this case, in the standard state, the projection position of the display light Lt on the combiner 5 is a position slightly above the optimum position.

FIG. 13 illustrates the display range 30*v* optimized for the combiner unit U2 of FIG. 8. The control unit 9 sets the display range 30*v* based on the setting value read from the nonvolatile memory. The display range 30*v* in FIG. 13 is set below the center of the lower display region 30*d* in the image vertical direction GV. The projection position of the display light Lt on the combiner 5 is adjusted to the reference position by such a display range 30*v*.

In the combiner unit U2 of FIG. 7, when the display range 30*v* is located at the center of the lower display region 30*d*, the projection position of display light Lt on the combiner 5 is the reference position. Therefore, the setting value for the vehicle display device 1 having the combiner unit U2 in FIG. 7 is a value with the display range 30*v* as the center position in the image vertical direction GV.

As described above, the control unit 9 sets the display position in the image vertical direction GV in the lower display region 30*d* so that the projection position of the display light on the combiner 5 is set as the reference position in a state where the rotation position of the reflection member 4 is set as the neutral position. As a result, the display position of the virtual image Vi can be adjusted by the motor 8 according to the position of the eye of the driver 200 for both the upper side Z1 and the lower side Z2 in the vehicle vertical direction Z. The control unit 9 turns the reflection member 4 by the motor 8 based on the coordinate value of the eye point EP acquired from the camera 10. The rotation amount of the motor 8 at this time is determined, for example, based on a table stored in advance. The table may be a unique table corresponding to the product number of the combiner unit U2.

The step of storing the setting value of the display range 30*v* in the vehicle display device 1 is performed, for example, in a factory that manufactures the vehicle display device 1. In this case, the setting value of the display range 30*v* is preferably determined in advance for each of the combiner units U2 having different product numbers. For example, the combiner units U2 illustrated in FIGS. 6 to 8 have different product numbers, and setting values of display ranges 30*v* are different from each other. In this case, the vehicle display device 1 is preferably shipped in a state in which the setting value optimized for the combiner unit U2 is stored. The control unit 9 of the vehicle display device 1 sets the display range 30*v* based on the setting value according to the combiner 5 assembled to the display device unit U1.

The step of storing the setting value may be executed after the vehicle display device 1 is mounted on the vehicle 100. In this case, for example, the setting value is determined by the operator and stored in the memory. Such an adjustment method is effective when the same combiner unit U2 is mounted for different vehicle types.

As described above, the vehicle display device 1 according to the present embodiment includes the display device unit U1 and the combiner unit U2. The display device unit U1 includes the image display device 3, the accommodation unit 6, the reflection member 4, the motor 8, and the control unit 9. The image display device 3 has the upper display region 30*u* and the lower display region 30*d* for displaying an image, and is disposed so that the upper display region 30*u* faces the eye point EP of the vehicle 100. The accommodation unit 6 accommodates the lower display region 30*d* and opens upward. The reflection member 4 is accommodated in the accommodation unit 6 and is rotatable within a predetermined range. The motor 8 turns the reflection member 4. The control unit 9 controls the image display device 3 and the motor 8.

The combiner unit U2 includes the hood portion 7 and the combiner 5. The hood portion 7 covers the upper display region 30*u* from the front of the vehicle. The combiner 5 is disposed closer to the eye point EP than the upper display region 30*u*. The reflection member 4 is disposed closer to eye point EP than the lower display region 30*d* and the combiner 5, and reflects display light Lt in the lower display region 30*d* toward the combiner 5. The rotation direction of the reflection member 4 is a direction in which the projection position of the display light Lt is changed in the vehicle vertical direction Z. The control unit 9 sets the display position of the image in the image vertical direction GV in the lower display region 30*d* according to the combiner 5 assembled to the display device unit U1. In the vehicle display device 1 of the present embodiment, the display device unit U1 can be shared with different combiner units U2.

The mounting condition of the vehicle display device 1 on the vehicle 100 is different for each vehicle type. The hood portion 7 and the combiner 5 are individually designed according to mounting conditions. Under such conditions, when the accommodation unit 6 and the reflection member 4 are individually designed in order to adjust the virtual image display affected by the mounting position, a large number of man-hours are required for the design. On the other hand, in the vehicle display device 1 of the present embodiment, the display area for the virtual image Vi in the image display device 3 is set wide, and the display range 30*v* is adjusted up and down. As a result, the display device unit U1 including the accommodation unit 6, the reflection member 4, and the motor 8 is made common.

The control unit 9 of the present embodiment sets the display position of the image in the image vertical direction GV in the lower display region 30*d* so that the projection position of the display light Lt on the combiner 5 is set to a predetermined reference position in a state where the position of the reflection member 4 in the rotation direction is set to the neutral position. Therefore, the vehicle display device 1 of the present embodiment can realize an appropriate projection position for different combiners 5.

The reference position of the present embodiment is a position where the projection position of the display light Lt on the combiner 5 is optimized with respect to the center position in the vehicle vertical direction Z in the eye range ER. Therefore, the projection position can be adjusted by the motor 8 in a wide range in the vertical direction.

The vehicle display device 1 of the present embodiment includes the cover unit U3 that closes the opening of the accommodation unit 6. The cover unit U3 includes the lid portion 60 and the transparent cover 62. The lid portion 60 has the through hole 61 and is assembled to the accommodation unit 6. The cover 62 is disposed in the through hole 61. The display light Lt reflected by the reflection member 4 is transmitted through the cover 62 and projected onto the combiner 5. With such a configuration, the optimum cover 62 can be combined with the combiner unit U2. The cover 62 may be shared with the plurality of the combiner units U2. In this case, the cover 62 and the lid portion 60 may be included in the display device unit U1.

Modification of Embodiment

The control unit 9 may adjust the height of the display range 30*v* according to the combiner unit U2. For example, for the combiner unit U2 having a large display height H as illustrated in FIG. 6, the display range 30*v* may be widened. For combiner unit U2 having a small display height H as illustrated in FIG. 8, the display range 30*v* may be narrowed.

When adjusting the projection position of the display light Lt according to the eye point EP, the control unit 9 may change both the rotation position of the reflection member 4 and the display range 30*v*. For example, when there is an eye point EP whose projection position cannot be optimized only by the rotation of the reflection member 4, the display range 30*v* may be changed.

The content disclosed in the above embodiments and modifications can be appropriately combined and executed.

A vehicle display device according to the present embodiment includes a display device unit including an image display device, and a combiner unit assembled to the display device unit. The control unit of the display device unit sets the display position of the image in the image vertical direction in the lower display region so that the motor can turn the reflection member to a rotation position corresponding to the eye point. According to the vehicle display device of the present embodiment, there is an effect that the display device unit can be made common.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a display device unit including an image display device;
a combiner unit assembled to the display device unit, wherein
the display device unit includes
the image display device including an upper display region and a lower display region for displaying an image, the upper display region being disposed to face an eye point of a vehicle,
an accommodation unit that accommodates the lower display region and is open upward,
a reflection member that is accommodated in the accommodation unit and is rotatable within a predetermined range,
a motor that turns the reflection member, and
a control unit that controls the image display device and the motor, wherein
the combiner unit includes
a hood portion covering the upper display region from a front of the vehicle, and
a combiner disposed closer to the eye point than the upper display region, wherein
the combiner has a display height, wherein
the display height is the height of the combiner in a vehicle vertical direction, or the height of the combiner in an image vertical direction when viewed from the eye point, wherein
the display device unit is configured to be able to combined with any of the plurality of combiner units having different display heights, wherein
the reflection member is disposed closer to the eye point than the lower display region and the combiner, and reflects display light of the lower display region toward the combiner, wherein
a rotation direction of the reflection member is a direction in which a projection position of the display light is changed in the vehicle vertical direction, and wherein
the control unit is configured to set a display position of an image in the lower display region in the image vertical direction according to the display height of the combiner assembled to the display device unit.

2. The vehicle display device according to claim 1, wherein
the control unit sets a display position of an image in the lower display region in the image vertical direction so that the projection position of the display light on the combiner is set to a predetermined reference position in a state where a position of the reflection member in the rotation direction is set to a neutral position.

3. The vehicle display device according to claim 2, wherein
the reference position is a position where the projection position of the display light on the combiner is optimized with respect to a center position of an eye range in the vehicle vertical direction.

4. The vehicle display device according to claim 1, further comprising:
a cover unit that closes an opening of the accommodation unit, wherein
the cover unit includes a lid portion having a through hole and assembled to the accommodation unit, and a transparent cover disposed in the through hole, and wherein
the display light reflected by the reflection member is transmitted through the cover and projected onto the combiner.

5. The vehicle display device according to claim 2, further comprising:

a cover unit that closes an opening of the accommodation unit, wherein the cover unit includes a lid portion having a through hole and assembled to the accommodation unit, and a transparent cover disposed in the through hole, and wherein the display light reflected by the reflection member is transmitted through the cover and projected onto the combiner.

6. The vehicle display device according to claim 3, further comprising:

a cover unit that closes an opening of the accommodation unit, wherein the cover unit includes a lid portion having a through hole and assembled to the accommodation unit, and a transparent cover disposed in the through hole, and wherein the display light reflected by the reflection member is transmitted through the cover and projected onto the combiner.

* * * * *